(12) United States Patent
Yamaguchi

(10) Patent No.: US 8,810,695 B2
(45) Date of Patent: Aug. 19, 2014

(54) IMAGE SENSING APPARATUS AND DEFECTIVE PIXEL DETECTION METHOD

(75) Inventor: Toshiro Yamaguchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 409 days.

(21) Appl. No.: 12/559,213

(22) Filed: Sep. 14, 2009

(65) Prior Publication Data

US 2010/0066872 A1 Mar. 18, 2010

(30) Foreign Application Priority Data

Sep. 16, 2008 (JP) ................... 2008-236313

(51) Int. Cl.
*H04N 9/64* (2006.01)
(52) U.S. Cl.
USPC ........................................ 348/247
(58) Field of Classification Search
USPC ................................ 348/246, 247
See application file for complete search history.

(56) References Cited

U.S. PATENT DOCUMENTS

| 6,683,643 | B1* | 1/2004 | Takayama et al. | 348/247 |
| 2002/0015111 | A1* | 2/2002 | Harada | 348/642 |
| 2003/0169346 | A1* | 9/2003 | Ojima et al. | 348/207.99 |
| 2008/0239115 | A1* | 10/2008 | Sugizaki | 348/246 |
| 2010/0007777 | A1* | 1/2010 | Walter et al. | 348/247 |

FOREIGN PATENT DOCUMENTS

| JP | 2005-341244 A | 12/2005 |
| JP | 2007-199907 A | 8/2007 |
| JP | 2008-131273 A | 6/2008 |

* cited by examiner

*Primary Examiner* — Albert Cutler
(74) *Attorney, Agent, or Firm* — Canon USA, Inc. IP Division

(57) ABSTRACT

An apparatus includes an image sensor, a detection unit, and a control unit. The image sensor photoelectrically converts an incident light from an object. The detection unit detects a defective pixel of the image sensor based on an image signal generated by the image sensor. The control unit controls, when a first defective pixel for irregularly outputting an abnormal level and a second defective pixel for regularly outputting an abnormal level in the image sensor are detected, storage time of the image sensor at the detection time of the first defective pixel to be longer than storage time of the image sensor at detection time of the second defective pixel and a number of image signals used for detection to be larger.

4 Claims, 6 Drawing Sheets

|  | TEMPERATURE | STORAGE TIME | NUMBER OF CAPTURING TIMES | DEFECT DETERMINATION THRESHOLD VALUE |
|---|---|---|---|---|
| FLICKER DEFECTIVE PIXEL DETECTION AND SHOOTING CONDITION | 25°C OR LESS | 1/1000s | 32 TIMES PEAK HOLD | 2mV |
| REGULAR DEFECTIVE PIXEL DETECTION AND CAPTURING CONDITION | 35°C~40°C | 2s | ONCE | 4mV |

FIG. 4

| | TEMPERATURE | STORAGE TIME | NUMBER OF CAPTURING TIMES | DEFECT DETERMINATION THRESHOLD VALUE |
|---|---|---|---|---|
| FLICKER DEFECTIVE PIXEL DETECTION AND SHOOTING CONDITION | 25°C OR LESS | 1/1000s | 32 TIMES PEAK HOLD | 2mV |
| REGULAR DEFECTIVE PIXEL DETECTION AND CAPTURING CONDITION | 35°C~40°C | 2s | ONCE | 4mV |

FIG. 5

| R11 | Gr21 | R31 | Gr41 | R51 |
|-----|------|-----|------|-----|
| Gb12 | B22 | Gb32 | B42 | Gb52 |
| R13 | Gr23 | R33 | Gr43 | R53 |
| Gb14 | B24 | Gb34 | B44 | Gb54 |
| R15 | Gr25 | R35 | Gr45 | R55 |

IMAGE SENSING APPARATUS AND DEFECTIVE PIXEL DETECTION METHOD

BACKGROUND OF THE INVENTION

1. Field of the Invention

The present invention relates to an image sensing apparatus and a method for detecting defective pixels of an image sensor.

2. Description of the Related Art

Pixels of a photoelectric transducer such as a charge coupled device (CCD) or a complementary metal oxide semiconductor (CMOS) sensor include defective pixels disabled to generate normal output signals due to crystal defects or dusts. Such defective pixels are mainly classified into the following two types in terms of time characteristics.

One is a regular defective pixel that cannot output any normal output signal at any time (abnormal output, hereinafter). The other is a flicker defective pixel that irregularly outputs a normal output signal and an abnormal output signal.

In the CMOS sensor, output characteristics are different between the regular defective pixel and the flicker defective pixel. In the regular defective pixel, white defects caused by crystal defects of a light receiving portion are predominant except for sensitivity-dependent defective pixels such as dusts or uneven apertures. The white defects are accompanied by an increase of dark signals, and hence an abnormal output level depends on a temperature and storage time.

In the case of the flicker defective pixel, places where crystal defects occur are different from those of the regular defective pixel, and hence an abnormal output level has almost no dependence on a temperature or storage time.

Referring to FIG. 6, a place where a crystal defect of a flicker defective pixel occurs will be described.

FIG. 6 illustrates an example of a general circuit of a pixel portion of the CMOS sensor. This circuit includes a photodiode (PD) 601 (a light receiving portion), a reset MOS 602 for resetting accumulated charges, a floating diffusion (FD) 603 for detecting charges, and a pixel source follower MOS 604. Many of regular defective pixels are caused by crystal defects of the PD 601.

On the other hand, flicker defective pixels are generated in the pixel source follower MOS 604, probably due to repetition of capturing and discharging electrons in interface order of a MOS transistor.

The abnormal output level of the flicker defective pixel has almost no temperature or storage dependence, and hence detection thereof has been difficult by the same defective pixel detection method as that for the regular defective pixel.

As a solution to the above situation, Japanese Patent Application Laid-Open No. 2005-341244 discusses a method for executing image-capturing of a plurality of frames, and specifying a defective pixel based on the number of times the output thereof has exceeded a predetermined threshold value.

The use of the method for executing image-capturing of the plurality of frames and specifying the defective pixel based on the number of times the output thereof has exceeded the predetermined threshold value enables detection of a flicker defective pixel.

However, depending on image-capturing conditions during defective pixel detection, abnormal output levels vary between the regular defective pixel and the flicker defective pixel. Thus, accurate detection of both defective pixels is difficult.

For example, the regular defective pixel depends on temperature and storage time, and hence its abnormal output level becomes higher under image-capturing conditions of high temperature and long-second storage. The regular defective pixel has its abnormal output level changed depending on a temperature and storage time. Thus, to accurately detect the regular defective pixel, a threshold value for an output for determining whether a pixel is a defective pixel has to be set higher as the temperature and the storage time increases.

On the other hand, the flicker defective pixel has no temperature or storage time dependence, and hence its abnormal output level does not become higher even under image-capturing conditions of high temperature and long-second storage.

Thus, as temperature becomes higher and storage time (second) becomes longer as conditions during defective pixel detection, an abnormal detection level of the regular defective pixel becomes higher as compared with that of the flicker defective pixel.

If a threshold value for an output for determining whether a pixel is a defective pixel is set by using the abnormal detection level of the regular defective pixel as a reference, a flicker defective pixel that is not dependent on temperature or storage time is difficult to be detected. As a result, even if defective pixel correction is carried out, an image is formed where a defective pixel that is easily detected at a low temperature and at short-second storage stands out.

For determination, when a lower temperature and shorter-second storage are set as conditions for defective pixel detection, the abnormality detection level of the regular defective pixel becomes lower as compared with that of the flicker defective pixel.

Thus, if a threshold value for an output for determining whether a pixel is a defective pixel is set by using the abnormal detection level of the flicker defective pixel as a reference, a regular defective pixel dependent on temperature and storage time is difficult to be detected. As a result, even if defective pixel correction is carried out, an image is formed where a defective pixel that is easily detected at high temperature and long-second storage stands out.

SUMMARY OF THE INVENTION

According to an aspect of the present invention, an image sensing apparatus includes an image sensor configured to photoelectrically convert an incident light from an object, a defective pixel detection unit configured to detect a defective pixel of the image sensor based on an image signal generated by the image sensor, and a control unit configured to control, when a first defective pixel for irregularly outputting an abnormal level and a second defective pixel for regularly outputting an abnormal level in the image sensor are detected, storage time of the image sensor at detection time of the first defective pixel to be longer than storage time of the image sensor at detection time of the second defective pixel, and a number of image signals used for detecting the first defective pixel is larger than the number of image signals used for detecting the second defective pixel.

According to another aspect of the present invention, A defective pixel detection method includes detecting a defective pixel of an image sensor based on an image signal generated by the image sensor configured to photoelectrically convert an incident light from an object, controlling when a first defective pixel for irregularly outputting an abnormal level and a second defective pixel for regularly outputting an abnormal level in the image sensor are detected, storage time of the image sensor at detection time of the first defective pixel to be longer than storage time of the image sensor at detection time of the second defective pixel, and a number of image signals used for detection to be larger.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 is a table illustrating examples of an image-capturing condition for detecting a flicker defective pixel and an image-capturing condition for detecting a regular defective pixel according to the exemplary embodiment of the present invention.

FIG. 5 illustrates a part of an effective pixel area of an image sensor constituted of a Beyer primary color array.

DETAILED DESCRIPTION OF THE EMBODIMENTS

Various exemplary embodiments, features, and aspects of the invention will be described in detail below with reference to the drawings. It is to be noted that the relative arrangement of the components, the numerical expressions, and numerical values set forth in these embodiments are not intended to limit the scope of the present invention.

Figure 1:
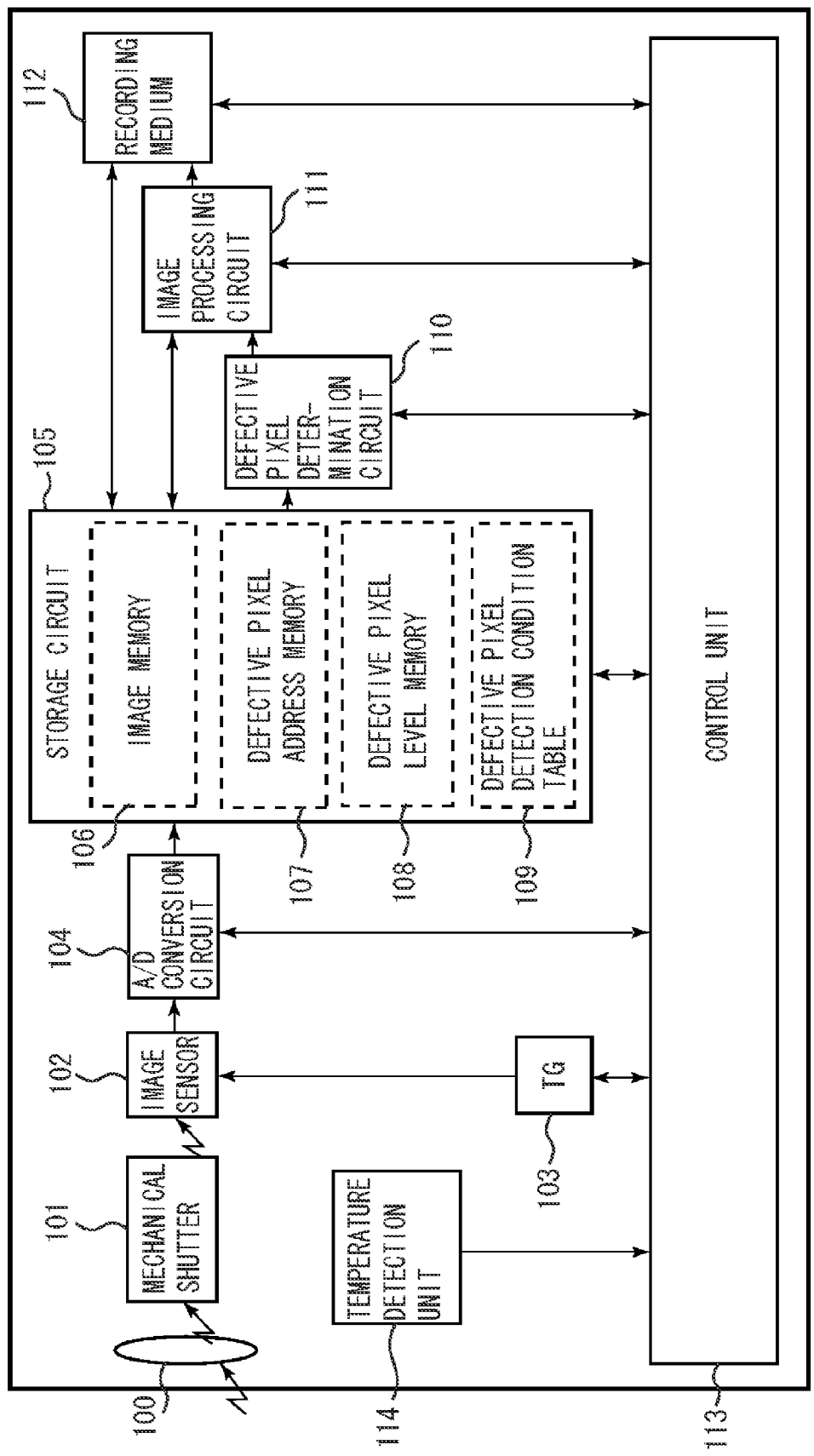
FIG. 1 is a block diagram illustrating a configuration of a digital still camera according to an exemplary embodiment of the present invention.

FIG. 1 is a block diagram illustrating a configuration of a digital still camera (image sensing apparatus) according to a first exemplary embodiment of the present invention.

In FIG. 1, a lens 100 focuses an incident light from an object on an image sensor 102. A mechanical shutter 101 blocks the light from the object transmitted through the lens 100. The image sensor 102 includes a photoelectric conversion function for converting light into an electric signal. In the exemplary embodiment, a CMOS sensor is used.

A timing generator (TG) 103 generates a timing signal for defining a timing of driving the image sensor 102. An A/D conversion circuit 104 converts an analog image signal (electric signal) output from the image sensor 102 into a digital image signal.

A storage circuit 105 includes an image memory 106, a defective pixel address memory 107, a defective pixel level memory 108, and a defective pixel detection condition table 109.

The image memory 106 includes, for example, a dynamic random access memory (DRAM), and temporarily stores a digital image signal output from the A/D conversion circuit 104 as RAW image data. The defective pixel address memory 107 stores an X address and a Y address that constitute coordinates of a defective pixel determined to be defective by a defective pixel determination circuit 110 described below during adjustment at a manufacturing plant or an operation of the image sensing apparatus.

The defective pixel level memory 108 stores an abnormal output level of the defective pixel determined to be defective by the defective pixel determination circuit 110 during adjustment at the manufacturing plant or the operation of the image sensing apparatus.

The defective pixel detection condition table 109 stores temperature, storage time of the image sensor, a number of image-capturing times, and conditions such as a threshold value of an image-output to determine a defective pixel. The defective pixel detection condition table 109 stores a flicker defective pixel detection image-capturing condition as a first detection condition, and a regular defective pixel detection image-capturing condition as a second detection condition.

The defective pixel determination circuit 110 performs predetermined calculation for an output of an inspection target pixel of the image sensor 102 to determine whether or not the inspection target pixel is a regular defective pixel or a flicker defective pixel.

An image processing circuit 111 converts the RAW data stored in the image memory 106 into a final output image format. A recording medium 112 records image data format-converted by the image processing circuit 111. For example, an SD card is used as the recording medium 112.

A control unit 113 (e.g., CPU) communicates with circuits mounted in the image sensing apparatus to perform overall control of the circuits. A temperature detection unit 114 constituted of a thermistor detects ambient temperature of the image sensor 102.

Next, referring to flowcharts of FIGS. 2 and 3, detection processing of defective pixels in the image sensing apparatus of the exemplary embodiment will be described. The flowchart of FIG. 2 illustrates an example of detection processing of flicker defective pixels, and the flowchart of FIG. 3 illustrates an example of detection processing of a regular defective pixel.

In the exemplary embodiment, abnormal outputs of a regular defective pixel and a flicker defective pixel have different characteristics, and hence different detection conditions are set to perform defect detection for the respective cases.

The exemplary embodiment illustrates an example of detecting defective pixels immediately after power-ON of the digital still camera and immediately after an operation of power-off. However, detection processing of defective pixels of the exemplary embodiment may be carried out during plant adjustment before digital still camera shipment.

Figure 2:
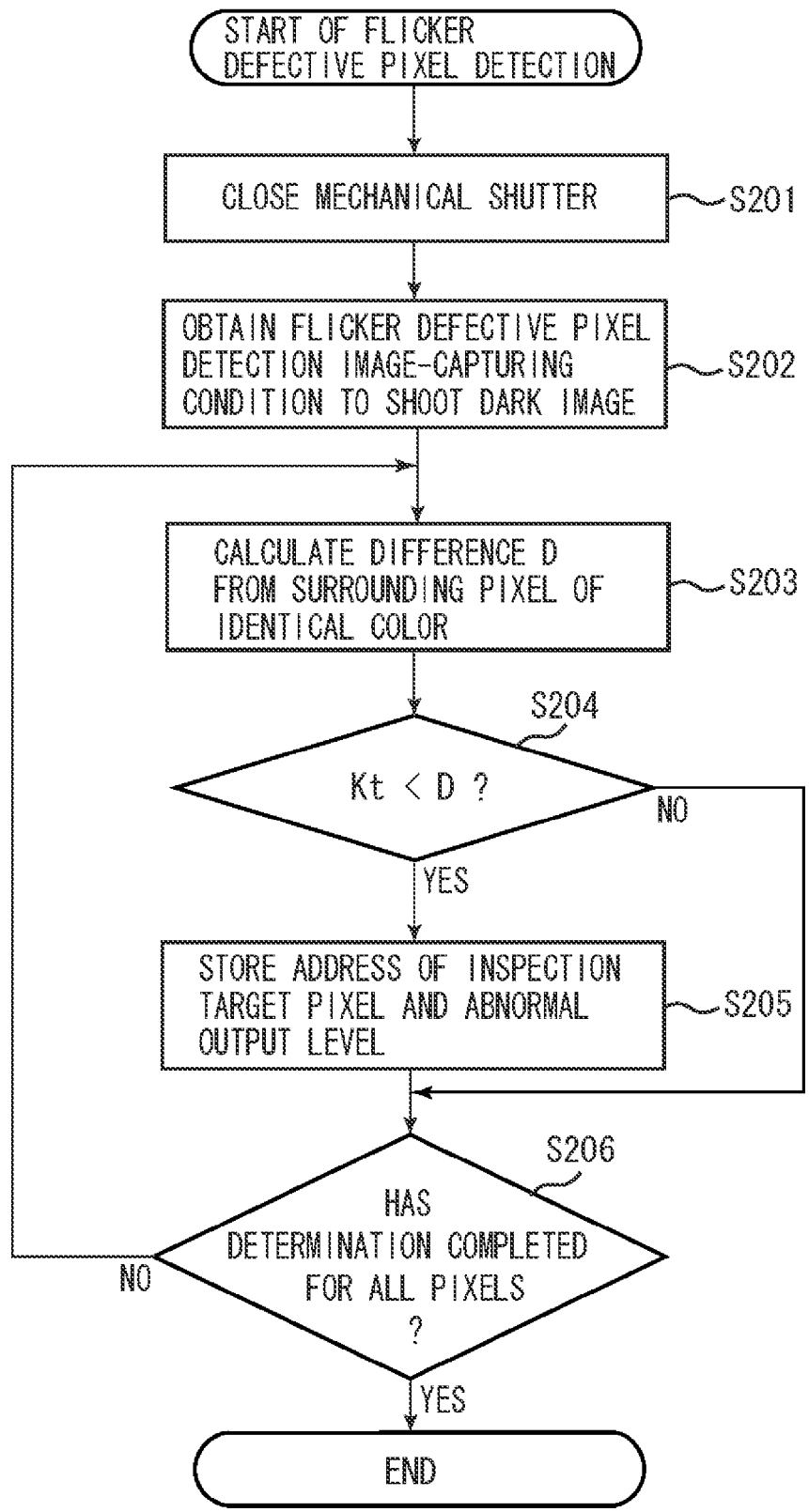
FIG. 2 is a flowchart illustrating detection processing of a flicker defective pixel according to the exemplary embodiment of the present invention.
Figure 3:
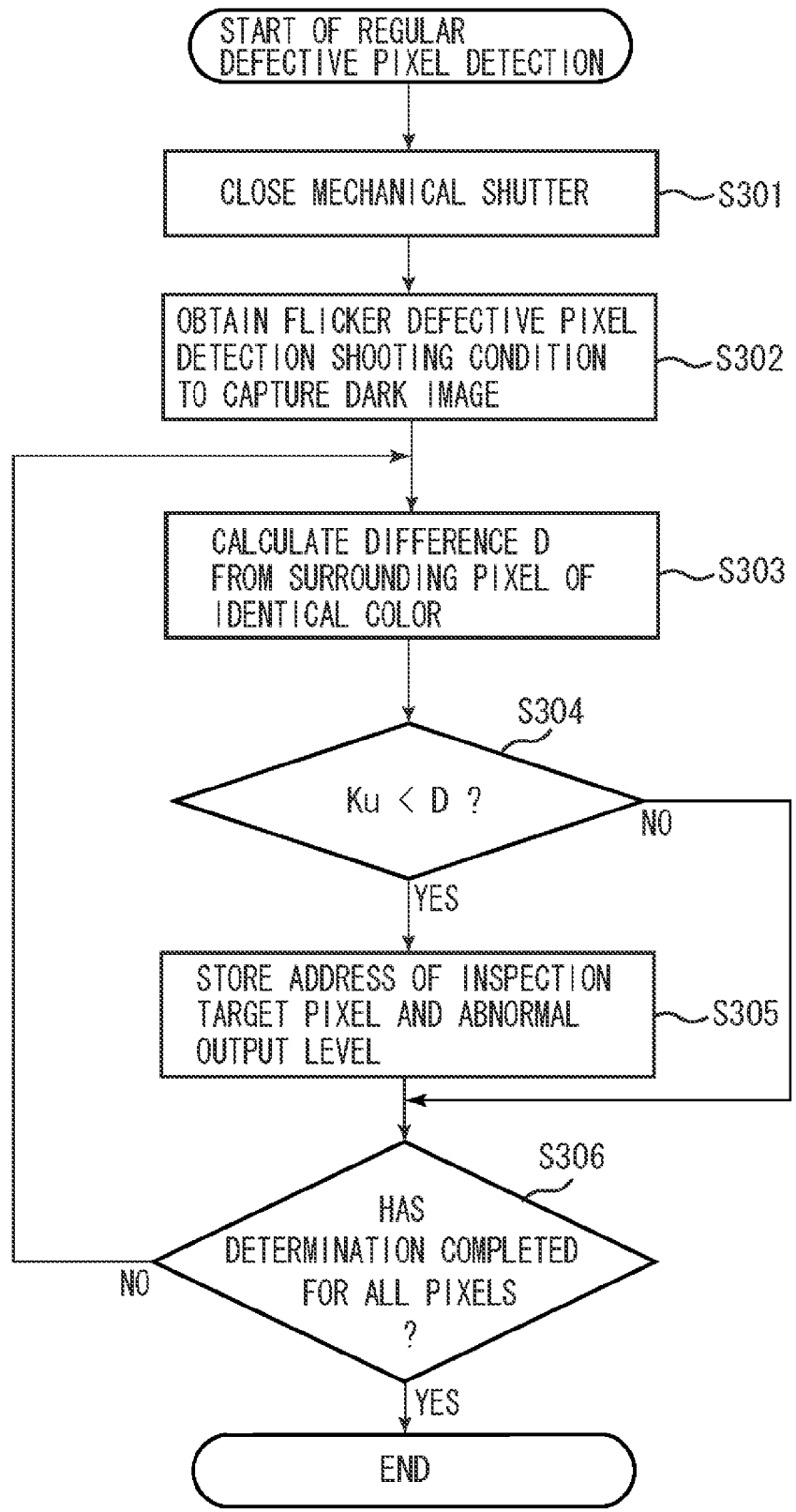
FIG. 3 is a flowchart illustrating detection processing of a regular defective pixel according to the exemplary embodiment of the present invention.
Figure 6:
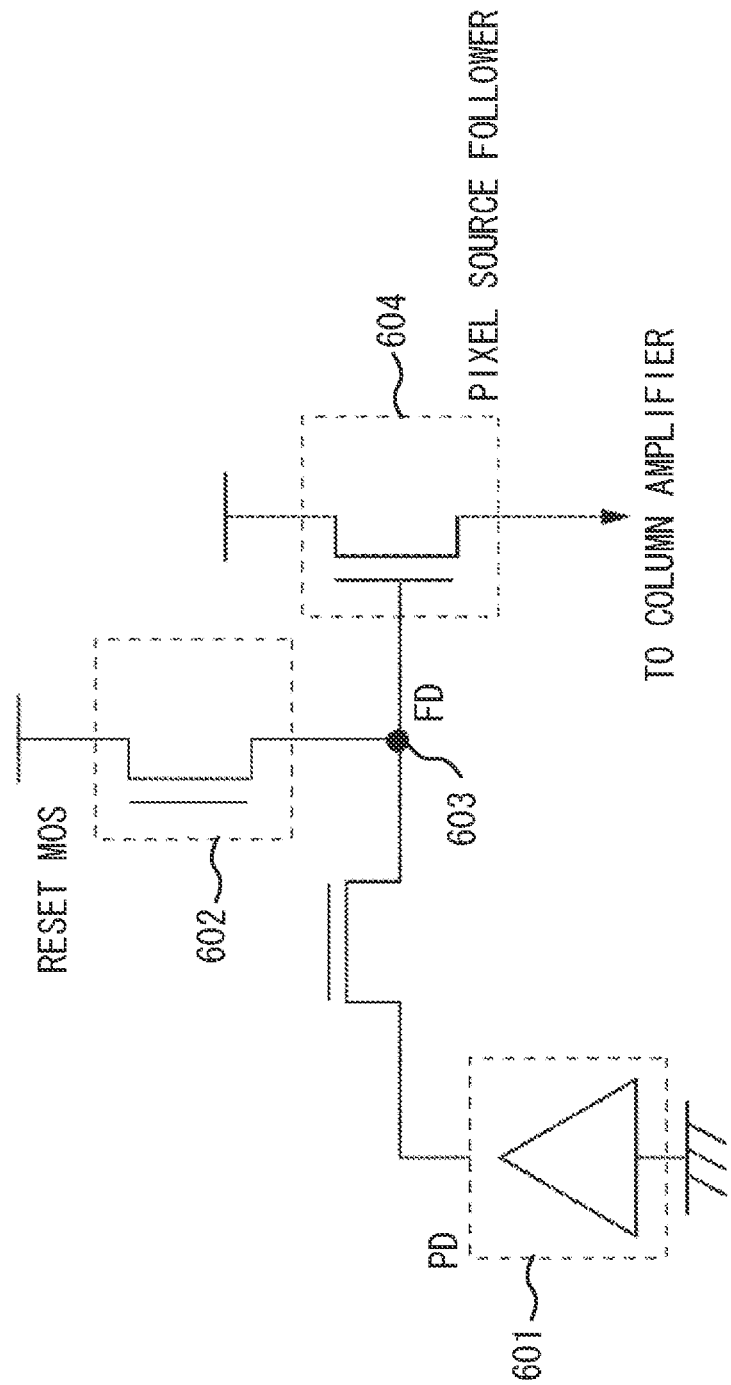
FIG. 6 illustrates an example of a general circuit of a pixel portion of a CMOS sensor.

The flowchart of FIG. 2 is started when a user carries out an operation for turning-on the digital still camera.

In step S201, the control unit 113 closes the mechanical shutter 101 to set the image sensor 102 in a light-blocked status.

In step S202, the control unit 113 obtains flicker defective pixel image-capturing conditions (e.g., to shoot dark image) shown in FIG. 4 from the defective pixel detection condition table 109 in the storage circuit 105. The control unit 113 operates the TG 103 or the storage circuit 105 according to the obtained image-capturing conditions, and controls the light-blocked image sensor 102 to generate a dark image signal.

FIG. 4 is a table illustrating examples of image-capturing conditions to detect a flicker defective pixel and image-capturing conditions to detect a regular defective pixel. As illustrated in FIG. 4, when a flicker defective pixel is detected, a regular defective pixel should be separated.

The abnormal output level of the regular defective pixel varies according to temperature and storage time, and hence storage time of the image sensor 102 is set to be short. Then, the detection is performed under low ambient temperature so that the regular defective pixel may not be detected easily.

Thus, a flicker defective pixel is detected immediately after an operation of turning-ON the digital camera that is supposed to be in low ambient temperature.

Therefore, before a start of detection processing of flicker defective pixels, the temperature detection unit 114 may measure ambient temperature of the image sensor 102. If the ambient temperature is higher than a reference value, detection processing of a flicker defective pixel may not be carried out.

The flicker defective pixel has characteristics of irregularly generating normal or abnormal outputs. Thus, the dark image signal should be captured as many times as possible.

However, processing time becomes longer as the number of image-capturing times is larger. Thus, a balanced value should be set in consideration of image-capturing time of the dark image signal and detection accuracy of the flicker defective pixel with respect to the number of times of capturing the dark image signal.

Referring to FIG. 5, an example of a method for determining whether or not a pixel is a defective pixel by using a difference value between an inspection target pixel and surrounding pixels of the same color as that of the inspection target pixel will be described.

The defective pixel determination circuit 110 performs, during detection of a flicker defective pixel, peak-holding for an output of each pixel in a dark image signal obtained a plurality of times, and determines a maximum output level of each pixel in the dark image signal obtained a plurality of times as an output level of the pixel.

FIG. 5 illustrates a part of an effective pixel area of the image sensor 102 constituted of a Beyer primary color array having pixels of R, G and B colors arranged in lattice. The exemplary embodiment will be described on the premise of the Beyer primary color array. However, other color filters (e.g., complementary color filters of yellow, magenta, and cyan) may be used.

In step S203 (i.e., calculate different D from surrounding pixel of identical color), the defective pixel determination circuit 110 obtains an added average value AVE of outputs of pixels, which are identical in color to that of the inspection target and positioned around the inspection target pixel, and a difference value D between the added average value and an output of the inspection target pixel.

In FIG. 5, when an inspection target pixel is a center pixel (i.e., R33), an added average value AVER33 of output levels of surrounding pixels R11, R13, R15, R31, R35, R51, R53, and R55 identical in color to the inspection target pixel is obtained by the following expression.

$$AVER33=(R11+R13+R15+R31+R35+R51+R53+R55)/8 \quad (1)$$

A difference value DR33 between the added average value AVER 33 and R33 is obtained by the following expression:

$$DR33=|R33-AVER33|$$

In step S204, the defective pixel determination circuit 110 reads a defect determination threshold value Kt for the flicker defective pixel detection and image-capturing conditions illustrated in FIG. 4 from the defective pixel detection condition table 109, and compares the defect determination threshold value Kt and DR33 (or D) obtained by the expression (2).

If the difference value DR33 is larger than the threshold value Kt (YES in step S204), determining that the inspection target pixel R33 (or R) is a flicker defective pixel, then the defective pixel determination circuit 110 proceeds to step S205. If the difference value DR33 is not larger than the threshold value Kt (NO in step S204), determining that the inspection target pixel R33 is not a flicker defective pixel, the defective pixel determination circuit 110 proceeds to step S206.

In step S205 (i.e., store address of inspection target pixel and abnormal output level), the defective pixel determination circuit 110 records an X address and a Y address (X=3 and Y=3 in FIG. 5) of the inspection target pixel determined to be a flicker defective pixel in the defective pixel address memory 107 of the storage circuit 105.

If the address of a newly detected defective pixel has been stored in the defective pixel address memory 107, the defective pixel determination circuit 110 integrates these pieces of information thereof. If not stored, the defective pixel determination circuit 110 stores it as new address information.

If addresses of the newly detected defective pixel have been already stored in the defective pixel address memory 107, the defective pixel determination circuit 110 determines whether an abnormal output level corresponding to the addresses has been stored in the defective pixel image level memory 108.

If the abnormal output level of the newly detected defective pixel has been stored, the defective pixel determination circuit 110 integrates these pieces of information thereof, and stores them as new abnormal output level information. When integrating the abnormal output levels, for example, the defective pixel determination circuit 110 has only to hold a higher-level value.

A capturing condition of a dark image signal during detection of a flicker defective pixel is different from that of a dark image signal during detection of a regular defective pixel, and hence a difference occurs between the abnormal output levels. Thus, different defect determination values should be set in detection of the flicker defective pixel and detection of the regular defective pixel.

For the defect determination threshold value Kt, image-capturing may actually be repeated by using the image sensor 102 to obtain an effective value experimentally. For the defect determination threshold value Kt, a plurality of levels of a defect determination threshold value may be prepared to switch abnormal output levels targeted for correction.

In step S206, the defective pixel determination circuit 110 determines whether all the pixels have been inspected (i.e., has determination completed for all pixels). If defective pixel determination has been carried out for all the pixels (YES in step S206), the flowchart is finished.

If there are any pixels that are not inspected (NO in step S206), the defective pixel determination circuit 110 selects another pixel as an inspection target pixel and the processing returns to step S203. Then, the defective pixel determination circuit 110 repeats the processing of steps S203 to S206 until completion of the processing for all the pixels.

Next, referring to the flowchart in FIG. 3, detection processing of a regular defective pixel will be described. The exemplary embodiment illustrates an example of detecting regular defective pixels when power is tuned off for the digital still camera. However, regular defective pixel detection may be carried out at any timing during a digital still camera operation as long as it won't interfere with an image-capturing operation. Detection processing of defective pixels of the present invention may be carried out during plant adjustment before digital still camera shipment.

The flowchart in FIG. 3 is started from step S301 when a user carries out an operation for turning-off the digital still camera. The abnormal output level of the regular defective pixel is temperature-dependent as described above. Thus, in the present exemplary embodiment, regular defective pixel detection is carried out at the time of power-off when temperature of the digital still camera is supposed to be high.

Thus, before starting of detection processing of regular defective pixels, the temperature detection unit 114 may measure ambient temperature of the image sensor 102. If the ambient temperature is higher than a reference value, detection processing of regular defective pixels may not be carried out.

In step S301, the control unit 113 closes the mechanical shutter 101 to set the image sensor 102 in a light-blocked status.

In step S302, the control unit 113 obtains regular defective pixel image-capturing conditions (e.g., to capture dark image) illustrated in FIG. 4 from the defective pixel detection condition table 109 in the storage circuit 105. The control unit 113 operates the TG 103 or the storage circuit 105 according to the obtained image-capturing conditions, and controls the light-blocked image sensor 102 to generate a dark image signal.

As illustrated in FIG. 4, when a regular defective pixel is detected, a flicker defective pixel should be separated. The flicker defective pixel is not dependent on temperature and storage time. Thus, the flicker defective pixel is prevented from being detected easily by setting long storage time of the image sensor 102 and setting a high abnormal output level of a regular defective pixel under high ambient temperature of the image sensor 102.

The regular defective pixel has characteristics of regularly outputting abnormal output levels, and hence the number of capturing times of a dark image signal may be one.

In step S303 (i.e., calculate the difference D from surrounding pixel of identical color), the defective pixel determination circuit 110 obtains an added average value AVE of outputs of pixels, which are identical in color to that of the inspection target and positioned around the inspection target pixel, and a difference value D between the added average value and an output of the inspection target pixel.

When an inspection target pixel is a pixel of R33 in FIG. 5, an added average value AVER33 of outputs of pixels around the inspection target pixel, and a difference value DR33 (or D) between the added average value and the output of the inspection target pixel are respectively obtained by the expressions (1) and (2) described above in step S204 in FIG. 2.

In step S304, the defective pixel determination circuit 110 reads a defect determination threshold value Ku in the regular defective pixel detection image-capturing conditions illustrated in FIG. 4 from the defective pixel detection condition table 109, and compares the defect determination threshold value Ku and DR33 obtained by the expression (2).

If the difference value DR33 is larger than the threshold value Ku (YES in step S304), determining that the inspection target pixel R33 is a regular defective pixel, the processing proceeds to step S305. If the difference value DR33 is not larger than the threshold value Ku (NO in step S304), determining that the inspection target pixel R33 is not a regular defective pixel, the processing proceeds to step S306.

In step S305, the defective pixel determination circuit 110 records an X address and a Y address (X=3 and Y=3 in FIG. 5) of the inspection target pixel determined to be a regular defective pixel in the defective pixel address memory 107 of the storage circuit 105.

If addresses of a newly detected defective pixel have been stored in the defective pixel address memory 107, the defective pixel determination circuit 110 integrates pieces of information thereof. If not stored, the defective pixel determination circuit 110 stores them as new address information.

If addresses of the newly detected defective pixel have been already stored in the defective pixel address memory 107, the defective pixel determination circuit 110 determines whether abnormal output level corresponding to the addresses has been stored in the defective pixel image level memory 108.

If the abnormal output level of the newly detected defective pixel has been stored, the defective pixel determination circuit 110 integrates pieces of information thereof. If not stored, the defective pixel determination circuit 110 stores it as new abnormal output level information. When integrating the abnormal output levels, for example, the defective pixel determination circuit 110 has only to hold a higher-level value.

For the defect determination threshold value Ku, image-capturing may actually be repeated by using the image sensor 102 to obtain an effective value experimentally.

For the defect determination threshold value Kt, a plurality of levels of a defect determination threshold value may be prepared to switch abnormal output levels targeted for correction. For example, as an ambient temperature of the image sensor 102 detected by the temperature detection unit 114 is higher, a defect determination threshold value Ku of a high value should be selected.

In step S306, the defective pixel determination circuit 110 determines whether all the pixels have been inspected. If defective pixel determination has been carried out for all the pixels (YES in step S306), this flowchart is finished. If there are any pixels that are not inspected (NO in step S306), the defective pixel determination circuit 110 selects another pixel as an inspection target pixel and the processing returns to step S303. Then, the defective pixel determination circuit 110 repeats the processing of steps S303 to S306 until completion of the inspection for all the pixels.

Using aforementioned method, pieces of information regarding the addresses and the abnormal output levels of the flicker defective pixels and the regular defective pixels, which are different from each other in characteristics, can be stored respectively in the defective pixel address memory 107 and the defective pixel level memory 108.

The image processing circuit 111 performs defective pixel correction for an image generated by the image sensor 102 by using the pieces of information stored in the defective pixel address memory 107 and the defective pixel level memory 108.

Any known correction methods can be used for the defective pixel correction, for example, a method in which interpolation is performed using adjacent images of identical colors. When R33 in FIG. 4 is a defective pixel, interpolation may be carried out by substituting the output level with an average value of pixels of identical colors adjacent up and down, and left and right.

Alternatively, interpolation may be carried out by substituting the output value with one of an average value of pixels of identical colors adjacent up and down and an average value of pixels of identical colors adjacent to the left and right.

There is another method for adaptively adding and averaging an average value of pixels of identical colors adjacent up and down or an average value of pixels of identical colors adjacent left and right. This method applies a larger weight to an average value in a small output difference direction between pixels of identical colors in an up-and-down direction and a left-and-right direction.

The present exemplary embodiment has been described by using the digital still camera as an example. However, the present invention can be applied even to a digital video camera or a monitor camera as long as it is an image sensing apparatus equipped with an image sensor that may include regular defective pixels and flicker defective pixels.

The exemplary embodiment has been described using the CMOS sensor as an example. However, the present invention can be applied to an image sensor including flicker defective pixels having characteristics of no storage time/temperature dependence or smaller dependence as compared with a regular defective pixel.

In the exemplary embodiment, the ambient temperature of the image sensor 102 is detected by using the temperature detection unit 114. However, if the storage time of a dark image signal used for detecting a regular defective pixel is set to be sufficiently longer than that of a dark image signal used for detecting a flicker defective pixel, influence of a temperature may be reduced.

The present invention includes a case where a computer program for realizing the defective pixel detection function of the exemplary embodiment is supplied directly or remotely from a system or an apparatus communicable with the image sensing apparatus.

Such a system or apparatus side includes the defective pixel address memory 107, defective pixel level memory 108, defective pixel detection condition table 109, defective pixel determination circuit 110, and the image processing circuit 111.

The system or apparatus side may transmit a command based on the defective pixel detection condition table to the image sensing apparatus to generate a dark image signal by the image sensing apparatus. The system or apparatus side receives the dark image signal to detect a defective pixel.

In this case, the computer of the system reads the computer program to execute it. Thus, the computer program installed in the computer to realize the function processing of the present invention also realizes the invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2008-236313 filed Sep. 16, 2008, which is hereby incorporated by reference herein in its entirety.

What is claimed is:

1. An image sensing apparatus comprising:
    an image sensor configured to photoelectrically convert an incident light from an object;
    a defective pixel detection unit configured to detect a defective pixel of the image sensor based on an image signal generated by the image sensor, wherein the defective pixel detection unit determines a pixel to be a defective pixel based on a threshold value; and
    a control unit configured to control the image sensor to perform capturing operation with a first storage time in a case that a first defective pixel for irregularly outputting an abnormal level signal is detected by the defective pixel detection unit, and perform capturing operation with a second storage time which is longer than the first storage time in a case that a second defective pixel for regularly outputting an abnormal level signal is detected by the defective pixel detection unit,
    wherein a number of capturing times with the first storage time for detecting the first defective pixel is larger than the number of capturing times with the second storage time for detecting the second defective pixel, and a threshold value for detecting the first defective pixel is set lower than a threshold value for detecting the second defective pixel.

2. The image sensing apparatus according to claim 1, wherein ambient temperature of the image sensor at the detection time of the first defective pixel is set lower than ambient temperature of the image sensor at the detection time of the second defective pixel.

3. A defective pixel detection method comprising:
    detecting a defective pixel of an image sensor based on an image signal generated by the image sensor configured to photoelectrically convert an incident light from an object, wherein the detecting further comprises determining a pixel to be the defective pixel based on a threshold value; and
    controlling the image sensor to perform capturing operation with a first storage time in a case that a first defective pixel for irregularly outputting an abnormal level signal is detected, and perform capturing operation with a second storage time which is longer than the first storage time in a case that a second defective pixel for regularly outputting an abnormal level signal is detected,
    wherein a number of capturing times with the first storage time for detecting the first defective pixel is larger than the number of capturing times with the second storage time for detecting the second defective pixel, and a threshold value for detecting the first defective pixel is set lower than a threshold value for detecting the second defective pixel.

4. The defective pixel detection method according to claim 3, wherein ambient temperature of the image sensor at the detection time of the first defective pixel is set lower than ambient temperature of the image sensor at the detection time of the second defective pixel.

* * * * *